US009411342B2

(12) United States Patent
Nagashima et al.

(10) Patent No.: US 9,411,342 B2
(45) Date of Patent: Aug. 9, 2016

(54) ELECTRONIC CONTROL DEVICE (71) Applicant: Hitachi Automotive Systems, Ltd., Hitachinaka-shi, Ibaraki (JP)

(72) Inventors: Kazuaki Nagashima, Kiryu (JP); Susumu Kaneko, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 104 days.

(21) Appl. No.: 14/177,345

(22) Filed: Feb. 11, 2014

(65) Prior Publication Data
US 2014/0285942 A1 Sep. 25, 2014

(30) Foreign Application Priority Data

Mar. 21, 2013 (JP) ................. 2013-058892

(51) Int. Cl.
*H01H 47/12* (2006.01)
*H01H 47/28* (2006.01)
*G05D 9/12* (2006.01)
*B60T 8/36* (2006.01)
*G05D 16/20* (2006.01)

(52) U.S. Cl.
CPC . *G05D 9/12* (2013.01); *B60T 8/368* (2013.01); *G05D 16/2013* (2013.01)

(58) Field of Classification Search
CPC .................. B60T 8/34; G05D 9/12
USPC ............................ 361/178; 701/36
See application file for complete search history.

(56) References Cited

U.S. PATENT DOCUMENTS

| 8,112,196 B2 * | 2/2012 | Takayanagi ............... 701/36 |
| 2004/0102888 A1 * | 5/2004 | Burgdorf et al. ............ 701/70 |
| 2008/0147272 A1 | 6/2008 | Kamiya et al. |
| 2009/0030571 A1 * | 1/2009 | Takayanagi ............... 701/36 |

FOREIGN PATENT DOCUMENTS

| JP | 2008-174218 A | 7/2008 |
| JP | 2012-99708 A | 5/2012 |

* cited by examiner

*Primary Examiner* — Thienvu Tran
*Assistant Examiner* — Lucy Thomas
(74) *Attorney, Agent, or Firm* — Crowell & Moring LLP (57) ABSTRACT

An electronic control device has a resin case to which a circuit board having a terminal contact pad is fixed; a hydraulic unit having an electromagnetic solenoid which controls a hydraulic circuit and a pressure sensor which detects a pressure of the hydraulic circuit; a motor post having a current-carrying member which electrically connects a motor and the circuit board and extending from the resin case and inserted in the hydraulic unit; and a fixing member which is provided at the resin case and holds an outer periphery of the pressure sensor. Positioning between the pressure sensor and the terminal contact pad of the circuit board is made by the motor post inserted in the hydraulic unit and fixation of the pressure sensor by the fixing member.

3 Claims, 6 Drawing Sheets

ELECTRONIC CONTROL DEVICE

BACKGROUND OF THE INVENTION

The present invention relates to an electronic control device to control, for instance, an anti-lock brake system (ABS) of a vehicle.

As the electronic control device used for the anti-lock brake system (ABS) of the vehicle, for instance, it is provided at a hydraulic pressure control block that conducts electricity to a vehicle body and mounts various hydraulic pressure control equipment such as a hydraulic pressure control solenoid (a pressure boosting valve and a pressure reducing valve) and various kinds of sensors. The electronic control device has a circuit board mounting thereon electronic components that drive the various hydraulic pressure control equipment and perform signal processing of the various kinds of sensors, and the circuit board is accommodated in a space inside a resin case. Such configuration has been disclosed in, for instance, Japanese Patent Provisional Publication No. 2008-174218 (hereinafter is referred to as "JP2008-174218").

A related art electronic control device usually employs, to connect the circuit board and the sensors through a bus bar, a so-called bus bar unit that is molded as a single-block from a plurality of bus bars, and this bus bar unit (or each bas bar) has a structure in which a sensor terminal is not directly pressure-welded to the circuit board. However, in recent years, there has been proposed and developed a bus bar less structure in which a terminal contact pad is provided on the circuit board then the sensor terminal directly contacts the terminal contact pad, which eliminates the need for the bus bar.

In the case of the electronic control device having the bus bar structure, because the bus bar unit provided with the bus bars is used, parts count might increase and also a size of the electronic control device (e.g. a size in a thickness direction of the bus bar unit) might increase.

In the case of the electronic control device having the bus bar less structure, due to the fact that the sensor terminal directly contacts the terminal contact pad, there is a risk that the circuit board will strain by a pressing force of the sensor terminal. For this problem, it is conceivable that, in order to suppress the strain of the circuit board, the circuit board is fixed with screws at a plurality of positions on the circuit board. However, this manner requires a plurality of screws, and parts count associated with the screw fixing might increase, Nevertheless, since no bus bar (no bus bar unit) is used, it is possible to reduce parts count of the bus bar unit and to realize size reduction of the electronic control device and reduction of products cost, For instance, it is disclosed in Japanese Patent Provisional Publication No. 2012-099708 (hereinafter is referred to as "JP2012-099708").

SUMMARY OF THE INVENTION

Figure 9:
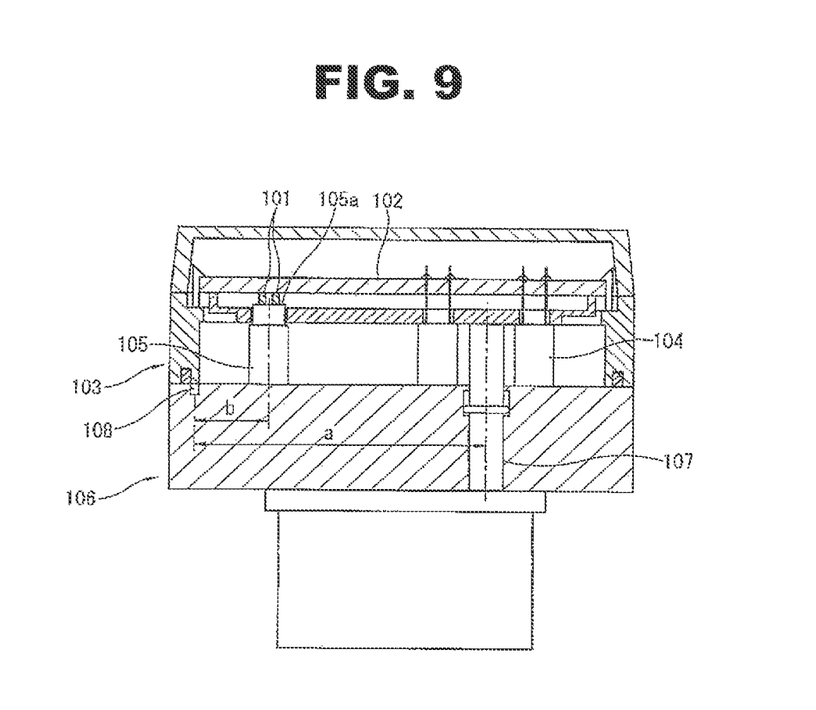
FIG. 9 is a drawing for explaining a problem arising in a case where a locating pin is used.

In the electronic control device having the bus bar less structure, as shown in FIG. 9, positioning alignment between a resin case 103 that supports a circuit board 102 provided with a terminal contact pad 101 and a hydraulic unit 106 that has an electromagnetic solenoid 104 and a pressure sensor 105 is made by a motor post 107 and a locating pin 108.

Because of this structure, both of an error of a distance "a" from the motor post 107 to the locating pin 108 and an error of a distance "b" from the locating pin 108 to the pressure sensor 105 become main factors of a deviation of positions or misalignment between the terminal contact pad 101 and the pressure sensor 105, and therefore the misalignment (or the deviation) between the terminal contact pad 101 and the pressure sensor 105 tends to occur. Thus, in order that the terminal contact pad 101 and the pressure sensor 105 are accurately aligned and a sensor terminal 105a of the pressure sensor 105 surely contacts the terminal contact pad 101, it is required to improve accuracy of the both distance "a" and distance "b".

It is therefore an object of the present invention to provide an electronic control device that is capable of improving the accuracy of positions of the terminal contact pad and the pressure sensor terminal by reducing the factor of the misalignment (variation of position) between them and also capable of obtaining good terminal contact between the terminal contact pad and the pressure sensor terminal.

According to one aspect of the present invention, an electronic control device comprises: a resin case to which a circuit board having a terminal contact pad is fixed; a hydraulic unit having an electromagnetic solenoid which controls a hydraulic circuit and a pressure sensor which detects a pressure of the hydraulic circuit; a motor post having a current-carrying member which electrically connects a motor and the circuit board, the motor post extending from the resin case and inserted in the hydraulic unit; and a fixing member which is provided at the resin case and holds an outer periphery of the pressure sensor, and positioning between the pressure sensor and the terminal contact pad of the circuit board is made by the motor post inserted in the hydraulic unit and fixation of the pressure sensor by the fixing member.

In the electronic control device, a pair of fixing members are arranged at least at both sides of the pressure sensor that is located at an opposite side to the motor post, and hold the outer periphery of the pressure sensor.

In the electronic control device, the fixing member is formed by an elastic arm portion that has elasticity.

According to the present invention, the electronic control device is configured to make positioning between the pressure sensor and the circuit board (the terminal contact pad of the circuit board) by the motor post whose outer periphery is fixed by the hydraulic unit and fixation of the pressure sensor whose outer periphery is fixed by the fixing member provided at the resin case, in which no locating pin is used. Since the locating pin that is one of the factors of the deviation of positions or misalignment between the terminal contact pad and the pressure sensor is not used, the factor of the misalignment between the terminal contact pad and the pressure sensor is reduced. It is therefore possible to improve the accuracy of positions of the terminal contact pad and the pressure sensor terminal, and good terminal contact between the terminal contact pad and the pressure sensor terminal can be obtained, Further, the electronic control device is configured so that the pair of fixing members are arranged at least at both sides of the pressure sensor that is located at the opposite side to the motor post, and hold the outer periphery of the pressure sensor. Thus, it is possible to suppress shift or misalignment between the hydraulic unit and the circuit board (the terminal contact pad of the circuit board) in a rotation direction with the motor post being a rotational axis.

Furthermore, in the electronic control device, the fixing member is formed by the elastic arm portion that is formed integrally with the resin case. Thus, even if shift of positions between the terminal contact pad of the circuit board and a sensor terminal of the pressure sensor arises within an assembly tolerance, by the elasticity of the elastic arm portion, good terminal contact between the terminal contact pad of the circuit board and the pressure sensor terminal of the pressure sensor can be maintained while holding and fixing the pressure sensor, and current-carrying to the pressure sensor can be maintained.

The other objects and features of this invention will become understood from the following description with reference to the accompanying drawings.

DETAILED DESCRIPTION OF THE INVENTION

Embodiments of an electronic control device of the present invention will now be explained below with reference to the drawings.

Figure 1:
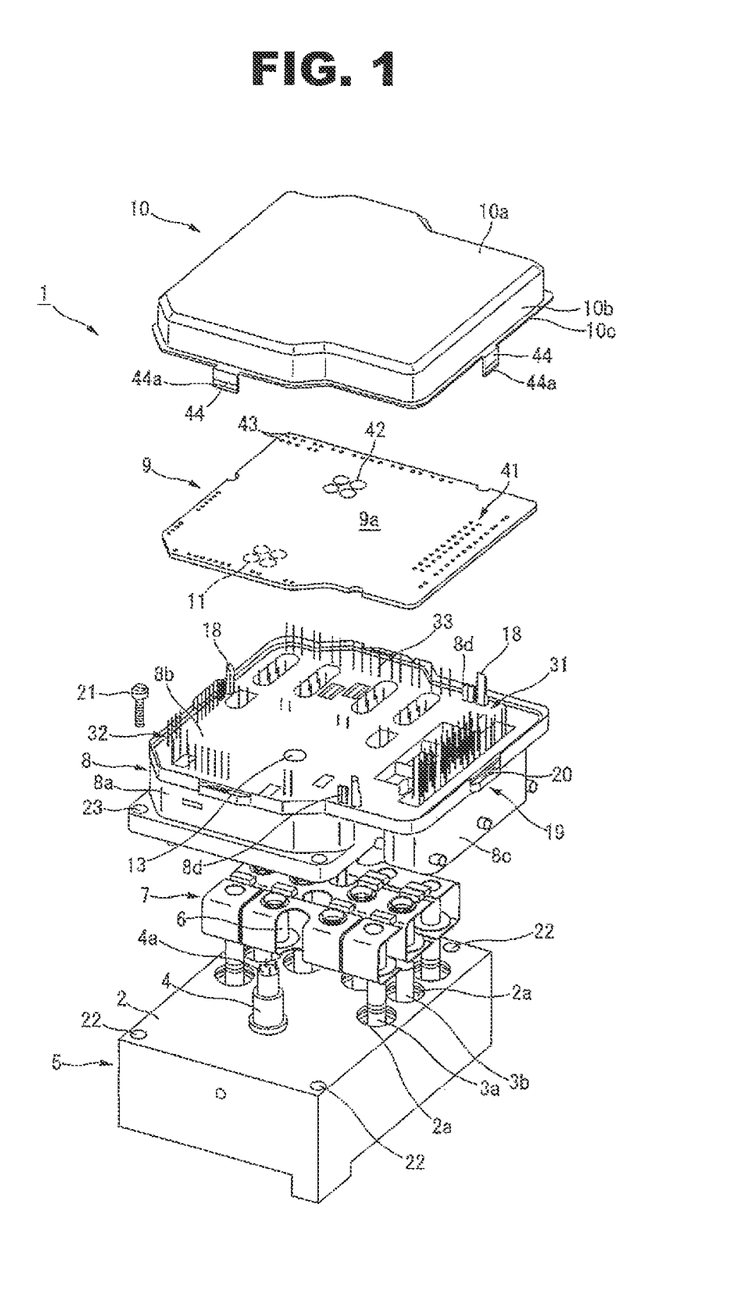
FIG. 1 is a perspective exploded view, viewed from an upper side, showing an example of an electronic control device of the present embodiments.

FIG. 1 is a perspective exploded view showing an example of the electronic control device of the present embodiments.

An electronic control device 1 has a hydraulic unit 5 having a hydraulic circuit (not shown) and a pump (not shown) which are accommodated in a unit body 2 and a pressure boosting valve 3a and a pressure reducing valve 3b as electromagnetic solenoids to control the hydraulic circuit and also a pressure sensor 4 which are fixed to an upper surface side of the unit body 2, a coil unit 7 to which a plurality of solenoid coils 6 disposed at outer circumferences of the pressure boosting valve 3a and the pressure reducing valve 3b are fixed, a resin case 8 which is fixed to the hydraulic unit 5 (to the upper surface side of the unit body 2) so as to cover the pressure boosting valve 3a, the pressure reducing valve 3b, the pressure sensor 4 and the coil unit 7, a circuit board 9 which is fixed to an upper side of a mid-bottom wall section 8b of the resin case 8, and a seal cover 10 which is fixed to the resin case 8 so as to cover the circuit board 9.

The circuit board 9 is provided, on a lower surface thereof, with a terminal contact pad 11 which a sensor terminal 4a of the pressure sensor 4 contacts.

Figure 2:
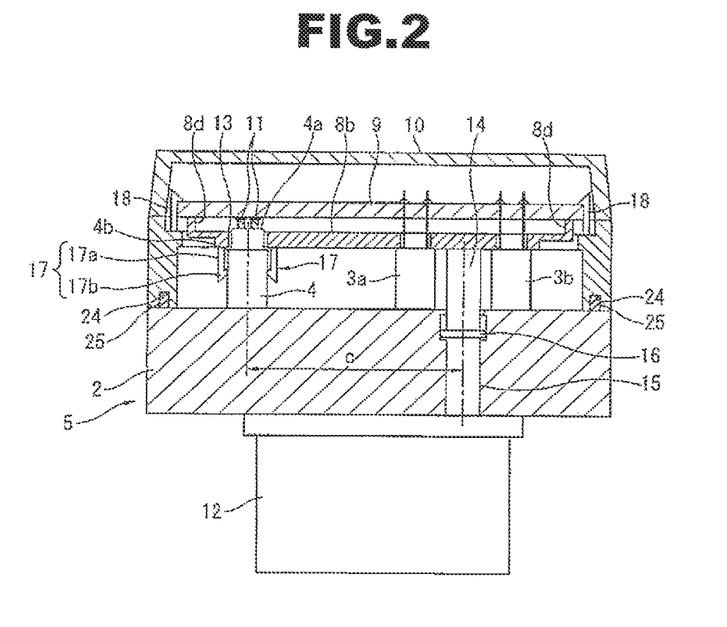
FIG. 2 is a local sectional view of the electronic control device of FIG. 1.

As shown in FIG. 2, a motor 12 that drives the pump is installed at a lower surface of the hydraulic unit 5. The sensor terminal 4a that is a top end of the pressure sensor 4 contacts the terminal contact pad 11 provided on the lower surface of the circuit board 9, The resin case 8 is provided with a motor post 14 extending toward the motor 12 and having a current-carrying member (not shown) to electrically connect the circuit board 9 and the motor 12. The motor post 14 is inserted into and fixed to a post insertion hole 15 that is formed at the hydraulic unit 5. As shown in FIG. 2, an O-ring 16 is interposed between the motor post 14 and an circumferential surface of the post insertion hole 15.

Further, the resin case 8 is provided with a pair of fixing members 17, 17 that are arranged along a circumferential edge of a pressure sensor insertion hole 13 (see FIGS. 1 and 2) and hold the pressure sensor 4 by sandwiching opposing side portions of an outer peripheral surface of the pressure sensor 4, The pair of fixing members 17, 17 each has an elastic arm portion 17a having elasticity and a nail portion 17b provided at a top end of the elastic arm portion 17a, Here, in FIG. 2, to show presence of the pair of fixing members 17, 17 in FIG. 2, these pair of fixing members 17, 17 are shown with each fixing member 17 shifted by a substantially 90° phase in a circumferential direction of the pressure sensor 4.

The circuit board 9 is fixed to the resin case 8 by snap-fits 18 with a position of the terminal contact pad 11 aligned with a position of the pressure sensor insertion hole 13 formed at the mid-bottom wall section 8b of the resin case 8.

When the pressure sensor 4 is inserted between the pair of fixing members 17, 17, these pair of fixing members 17, 17 are spread or opened, then the pressure sensor 4 is sandwiched and held by the pair of fixing members 17, 17, In this manner, a relative position relationship between the pressure sensor 4 and the circuit board 9 is fixed.

Accordingly, the cause of a deviation of positions or misalignment between the sensor terminal 4a of the pressure sensor 4 and the terminal contact pad 11 of the circuit board 9 is dependent on only an error of a distance "c" between the pressure sensor 4 and the motor post 14. By suppressing this error to a minimum (to a small error), the deviation of positions or the misalignment between the sensor terminal 4a and the terminal contact pad 11 can be suppressed, In a case of the related art shown in FIG. 9, both of an error of a distance "a" from a motor post 107 to a locating pin 108 and an error of a distance "b" from the locating pin 108 to a pressure sensor 105 become main factors of a deviation of positions or misalignment between a terminal contact pad 101 and the pressure sensor 105. In contrast to this, the present invention narrows the cause (the factor) of the deviation of positions or the misalignment between the terminal contact pad and the pressure sensor to only the error of the distance "c" between the pressure sensor 4 and the motor post 14. This therefore facilitates a dimension control, and the error of the distance can be small.

The electronic control device of the present invention can be applied to various devices without limiting to the anti-lock brake system (ABS). As an example, the electronic control device can be applied to a traction control device.

<Configuration of Electronic Control Device>

In the following description, the electronic control device of the present embodiments, which is applied to the anti-lock brake system (ABS) of the vehicle, will be explained below.

First, general outlines of the anti-lock brake system will be explained, The anti-lock brake system has a master cylinder that produces a brake pressure according to driver's brake pedal depression amount, a main oil passage that connects the master cylinder and each wheel cylinder of front right and left wheels (FR, FL) and rear right and left wheels (RR, RL), after-mentioned normally-open solenoid type pressure boosting valve and normally-closed solenoid type pressure reducing valve that are provided on the main oil passage and control a brake fluid pressure applied from the master cylinder to each wheel cylinder, a plunger pump that is provided on the main oil passage and discharges a brake fluid pressure to each wheel cylinder, a reservoir tank that stores, through the pressure reducing valve, brake fluid discharged from each wheel cylinder and supplies the brake fluid to the main oil passage by an operation of the plunger pump, and a pressure sensor.

The pressure boosting valve is configured to control the brake fluid pressure applied from the master is cylinder so as to be able to supply it to each wheel cylinder in a normal braking operation. The pressure reducing valve is configured to open when an internal pressure of each wheel cylinder becomes a predetermined pressure or greater and slip of a wheel occurs, and return the brake fluid to the reservoir tank. Open/close of these pressure boosting valve and pressure reducing valve are controlled through the electronic control device (described later), then boost, reduction and hold of the brake fluid pressure in each wheel cylinder are controlled. The pressure boosting valve and the pressure reducing valve are configured to open/close by current-supply based on a control signal from the electronic control device.

The pressure sensor senses the brake fluid pressure and sends a sensor signal to the electronic control device for the control of the open close operation of the pressure boosting valve and the pressure reducing valve.

Next, the electronic control device 1 shown in FIGS. 1 to 8 will be explained.

As described above, the electronic control device 1 shown in FIG. 1 has the hydraulic unit 5 having the hydraulic circuit (not shown) and the pump (not shown) which are accommodated in the unit body 2 and the plurality of pressure boosting valve 3a and pressure reducing valve 3b to control the hydraulic circuit and also the pressure sensor 4 which are fixed to the upper surface side of the unit body 2, the coil unit 7 to which the plurality of solenoid coils 6 disposed at the outer circumferences of the electromagnetic solenoids 3 are fixed, the resin case 8 which is fixed to the hydraulic unit 5 (to the upper surface side of the unit body 2) so as to cover the pressure boosting valve 3a, the pressure reducing valve 3b, the pressure sensor 4 and the coil unit 7, the circuit board 9 which is fixed to the upper side of the mid-bottom wall section 8b of the resin case 8, and the seal cover 10 which is fixed to the resin case 8 so as to cover the circuit board 9.

A hydraulic pipe (not shown) and the pump (not shown) are installed inside the unit body 2, and the plurality of pressure boosting valve 3a and pressure reducing valve 3b and the pressure sensor 4 are fixed to the upper surface side of the unit body 2, More specifically, these pressure boosting valve 3a, pressure reducing valve 3b and pressure sensor 4 are fixed to the upper surface side of the unit body 2 with each lower portion of the pressure boosting valve 3a, the pressure reducing valve 3b and the pressure sensor 4 inserted into and secured to a holding hole 2a that is formed at the unit body 2.

The unit body 2 is formed as a single block into a substantially cubic shape from, for instance, an aluminium alloy. The unit body 2 is provided at the upper surface side thereof with the plurality of holding holes 2a, and each lower portion of the pressure boosting valve 3a, the pressure reducing valve 3b and the pressure sensor 4 is inserted into and secured to the holding hole 2a.

In addition, main and sub oil passages connecting to the pressure boosting valve 3a, the pressure reducing valve 3b and the pressure sensor 4 and the plunger pump supplying the brake fluid pressure to the main oil passage, are provided inside the unit body 2.

Also, as shown in FIG. 2, the motor 12 is fixed to a lower surface of the unit body 2. The upper surface of the unit body 2 is provided at four corners thereof with female screw holes 22 into which fixing bolts 21 are screwed, Here, instead of the plunger pump, a reversible gear pump could be used.

The coil unit 7 is fixed to an upper side of the unit body 2, and the plurality of solenoid coils 6 are installed at the coil unit 7. As mentioned above, these plurality of solenoid coils 6 are disposed at the outer circumferences of the pressure boosting valve 3a and the pressure reducing valve 3b.

The resin case 8 has a tubular circumferential wall section 8a, the flat plate mid-bottom wall section 8b that covers an upper end side opening of the circumferential wall section 8a and spreads in a horizontal direction and a connecter wall section 8c that is a circumferential edge part protruding from the circumferential wall section 8a in the horizontal direction and located at a lower surface side of the mid-bottom wall section 8b. The tubular circumferential wall section 8a stands in a vertical direction so as to surround four sides of an upper surface side of the hydraulic unit 5, and protects projecting portions of the pressure boosting valve 3a, the pressure reducing valve 3b, the pressure sensor 4.

The connecter wall section 8c has a structure in which a power connecter connected to a battery, a motor connecter to supply power to the electric motor 12, a signal connecter that is a signal path for a resolver, CAN communication and I/O are connected.

Figure 3:
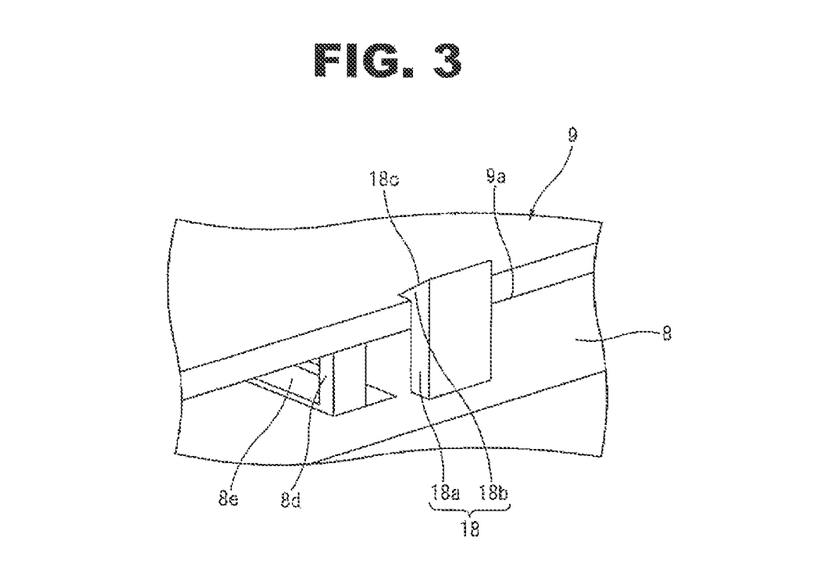
FIG. 3 is a perspective view showing a snap-fit.

As shown in FIGS. 2 and 3, a plurality of circuit board supporting portions 8d that support the circuit board 9 are provided at the mid-bottom wall section 8b, and the circuit board 9 to control the drive of the motor etc. is fixed on the circuit board supporting portions 8d.

The resin case 8 is formed as an integral block plate from the circumferential wall section 8a, the mid-bottom wall section 8b, the connecter wall section 8c and circuit board supporting portions 8d, from synthetic resin material by molding. As shown in FIG. 2, the motor post 14 is provided on a lower surface of the mid-bottom wall section 8b.

An outside shape of the resin case 8 is formed into a substantially rectangular shape along outside shapes of the hydraulic unit 5 and the seal cover 10. The resin case 8 is provided at an upper edge outer circumference thereof with seal cover stopper portions 19 that hold the seal cover 10 closed (hold a closing state of the seal cover 10).

A penetration hole 20 is formed at the seal cover stopper portion 19, and a nail portion 44a of a stopper piece 44 (described later) of the seal cover 10 is inserted into the penetration hole 20. More specifically, the seal cover stopper portion 19 is formed so that the seal cover 10 can be attached to and detached from the resin case 8 by inserting the nail portion 44a of the stopper piece 44 into the penetration hole 20 and engaging a lower edge of the stopper piece 44 with a lower surface of the seal cover stopper portion 19. Further, the resin case 8 is provided at corners of the outer circumference thereof with bolt insertion holes 23 into which the plurality of fixing bolts 21 are inserted.

Furthermore, as shown in FIG. 2, the resin case 8 is provided at a lower edge outer circumference thereof with a circular seal fitting groove 24, Also, a circular seal 25 is fitted in this hollow groove 24, then a gap between the resin case 8 and the hydraulic unit 5 are sealed. The resin case 8 is secured to the hydraulic unit 5 with the fixing bolts 21 that are inserted into the bolt insertion holes 23 and screwed into the female screw holes 22, As can be seen in FIG. 1, a pressure sensor insertion hole 13 into which the sensor terminal 4a of the pressure sensor 4 is inserted is formed on the mid-bottom wall section 8b of the resin case 8. In addition, a terminal group 31 to which the power connecter, the motor connecter and the signal connecter are connected, a terminal group 32 for a control signal to drive a motor relay and a semiconductor switching element (FET) and a terminal group 33 connecting to the pressure boosting valve 3a and the pressure reducing valve 3b etc. penetrate the mid-bottom wall section 8b, then the terminal groups 31, 32 and 33 project from an upper surface of the mid-bottom wall section 8b.

Further, to support and hold the circuit board 9, the snap-fits 18 are formed at three side predetermined positions, except the terminal group 31 side, of four sides of a circumferential edge on the upper surface of the mid-bottom wall section 8*b*.

As shown in FIG. 3, the snap-fit 18 has an elastic portion 18*a* that is provided so as to stand on the resin case 8 and a nail portion 18*b* that is formed at a top end of the elastic portion 18*a*.

The nail portion 18*b* has, at an upper surface thereof, an inclined surface 18*c*. When mounting the circuit board 9 on the circuit board supporting portion 8*d* from the upper side of the mid-bottom wall section 8*b*, first the inclined surface 18*c* is pressed by a lower edge 9*a* of the circuit board 9 and is elastically moved (or opens) outwards, then returns after the circuit board 9 is pressed down and positioned under the inclined surface 18*c*. In this manner, a circumferential edge of an upper surface of the circuit board 9 is pressed by a lower surface of each nail portion 18*b*, then the circuit board 9 is held or fixed on the circuit board supporting portion 8*d*.

The circuit board supporting portion 8*d* is provided at the resin case 8 through an elastic part 8*e*. Thus, as described above, when mounting the circuit board 9 on the circuit board supporting portion 8*d* and pressing the circumferential edge of the upper surface of the circuit board 9 by the nail portion 18*b* of the snap-fit 18, the elastic part 8*e* is elastically bent and has a reaction force, thereby sandwiching and fixing the circuit board 9 between the circuit board supporting portion 8*d* and the nail portion 18*b* of the snap-fit 18.

The circuit board 9 is formed from, for instance, synthetic resin material, and has a substantially rectangular thin plate shape. When the circuit board 9 is mounted on the circuit board supporting portion 8*d* from the upper side of the mid-bottom wall section 8*b* and supported and held by the snap-fit 18, the circuit board 9 is set with the circuit board 9 being separate from the mid-bottom wall section 8*b* in the vertical direction according to supporting or holding positions of the snap-fits. Due to the fact that a clearance between the circuit board 9 and the mid-bottom wall section 8*b* in the vertical direction is given, electronic components etc. that are mounted on the lower surface of the circuit board 9 do not interfere with the mid-bottom wall section 8*b*.

The circuit board 9 mounts thereon a plurality of electronic components including a microcomputer, and a power distribution pattern that is a part of a control circuit is formed on the circuit board 9, then, for instance, a drive control signal of the electric motor is generated by the circuit board 9. Further, as shown in FIG. 1, the circuit board 9 is provided with a number of connecter terminal holes 41, motor supply terminal holes 42 and a number of solenoid terminal holes 43 at one periphery and the other periphery of the circuit board 9. Then, terminal pins of the terminal groups 31, 32 and 33 are inserted into the terminal holes 41, 42 and 43 and electrically connected to the terminal holes by soldering.

As shown in FIG. 2, the terminal contact pad 11 is provided on the lower surface of the circuit board 9. The terminal contact pad 11 is provided at a position at which the sensor terminal 4*a* of the pressure sensor 4 contacts the terminal contact pad 11 through the pressure sensor insertion hole 13 formed on the mid-bottom wall section 8*b*. The snap-fit 18 is located in close proximity to the terminal contact pad 11. As described above, this snap-fit 18 (the snap-fits 18) presses the circumferential edge of the upper surface of the circuit board 9 mounted on the circuit board supporting portion 8*d* by the nail portion 18*b*, then sandwiches and fixies the circuit board 9 between the circuit board supporting portion 8*d* and the nail portion 18*b*.

Next, the seal cover 10 will be explained. As shown in FIG. 1, the seal cover 10 is formed into a thin dished shape along an outside shape of the resin case 8 from, for instance, an aluminium alloy having heat dissipation (heat radiation) and serving as a heat sink. The seal cover 10 is formed from a flat upper wall 10*a*, a substantially rectangular looped side wall 10*b* that is formed integrally with an outer circumferential edge of the upper wall 10*a* and a rectangular-frame-shaped flange 10*c* that is continuously formed integrally with an lower edge outer circumference of the side wall 10*b*.

The flange 10*c* is provided with four stopper pieces 44 that protrude downwards. These four stopper pieces 44 connect to or catch an upper edge outer circumference of the resin case 8 when the resin case 8 is covered by the seal cover 10 with the circuit board 9 accommodated in the seal cover 10. This stopper piece 44 is formed from material having elasticity. Each stopper piece 44 is disposed at a substantially middle position in a longitudinal direction of respective sides of the flange 10*c* which corresponds to a position of the seal cover stopper portion 19 provided at the resin case 8.

As can be seen in FIG. 1, the stopper piece 44 has, at a is top end thereof, a stopper nail 44*a* having elasticity. When the stopper nail 44*a* is inserted into the penetration hole 20 formed at the seal cover stopper portion 19 while elastically being bent to a side wall 10*b* side then protrudes from the penetration hole 20, the stopper nail 44*a* elastically returns and is engaged with the lower surface of the seal cover stopper portion 19, thereby maintaining a fixing state in which the seal cover 10 covers the resin case 8 and the both are fixed together, Next, the fixing member 17 will be explained with reference to FIGS. 4 to 6.

Figure 4:
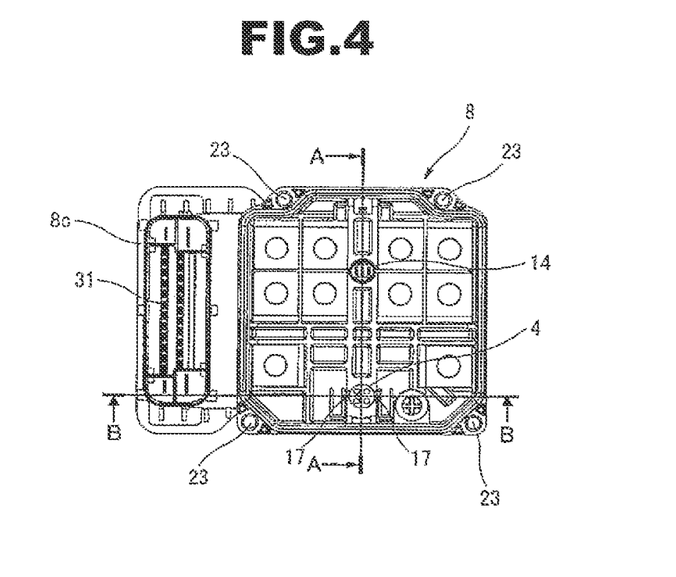
FIG. 4 is a plan view showing an essential part in a resin case.

FIG. 4 is a drawing for explaining an essential part in the resin case 8. In FIG. 4, the reference sign 4 is the pressure sensor, the reference sign 14 is the motor post, the reference signs 17, 17 are the fixing members that hold the pressure sensor 4 by sandwiching the opposing side portions of the outer peripheral surface of the pressure sensor 4.

The fixing members 17, 17 are arranged at both sides of the pressure sensor 4 that is located at an opposite side to the motor post 14. More specifically, the fixing members 17, 17 are arranged at both sides, in a direction orthogonal to a straight line L1 connecting a center of the motor post 14 and a center of the pressure sensor 4, of the pressure sensor 4. Then, a rotational movement of the pressure sensor 4 on the motor post 14 is limited (a rotational movement of the pressure sensor 4 with the motor post 14 being a rotational axis is limited).

The reference sign 8*c* is the connecter wall section provided at the resin case 8, and the terminal group 31 is accommodated in the connecter wall section 8*c*. The reference sign 23 is the bolt insertion hole.

Figure 5:
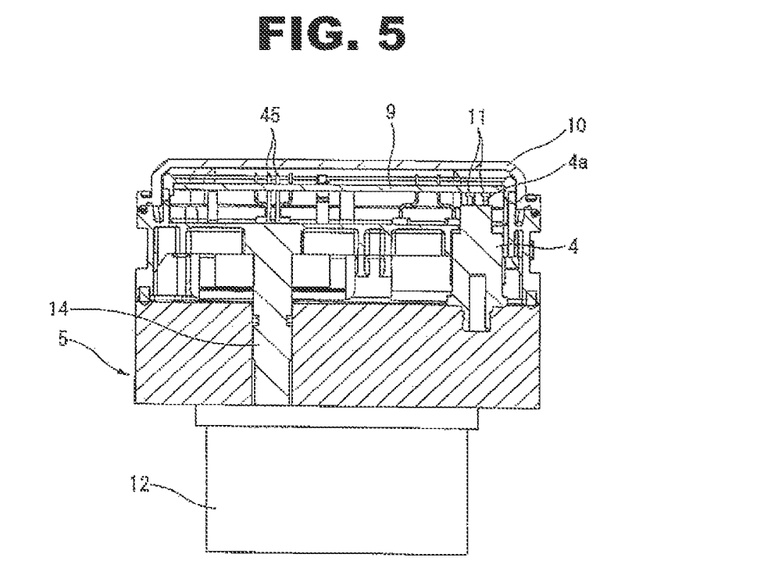
FIG. 5 is a sectional view taken along A-A of FIG. 4.

FIG. 5 is a sectional view taken along A-A of FIG. 4. The sensor terminal 4*a* of the pressure sensor 4 contacts the terminal contact pad 11 provided on the lower surface of the circuit board 9. Further, one end portion of the current-carrying member accommodated inside the motor post 14 is connected to the circuit board 9 through a connecting terminal 45, and the other end of the current-carrying member is connected to the motor 12.

In FIG. 5, the reference sign 5 is the hydraulic unit, the reference sign 12 is the motor installed at the lower surface of the hydraulic unit 5, and the reference sign 10 is the seal cover.

Figure 6:
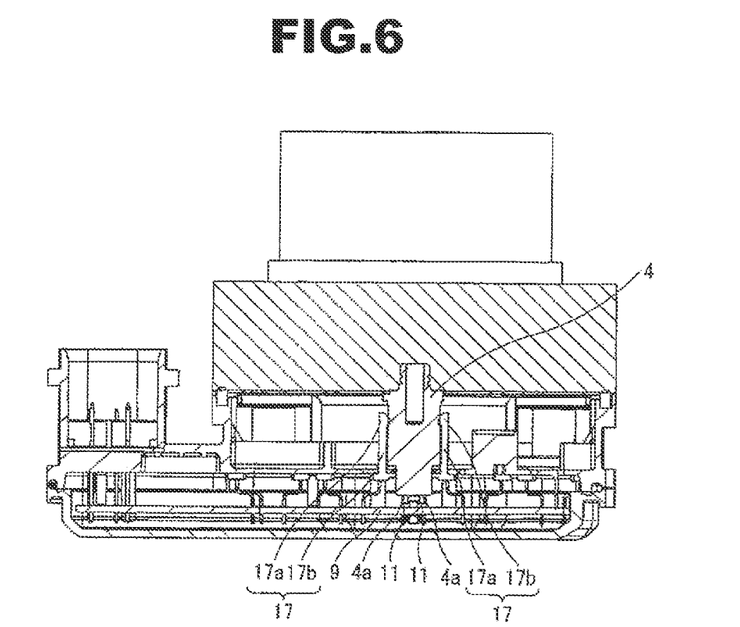
FIG. 6 is a sectional view taken along B-B of FIG. 4.

FIG. 5 is a sectional view taken along B-B of FIG. 4. The pair of fixing members 17, 17 each has the elastic arm portion 17*a* having elasticity and the nail portion 17*b* provided at the top end of the elastic arm portion 17*a*.

Figure 7:
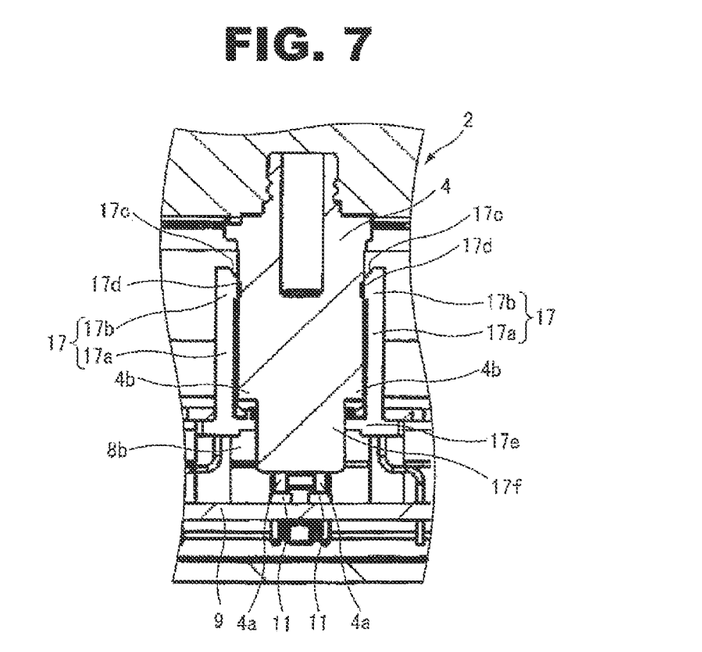
FIG. 7 is a local enlarged view of FIG. 6.

As shown in FIG. 7 that is a local enlarged view of FIG. 6, the nail portion 17*b* has an inclined surface 17*c* which a shoulder portion 4b of the pressure sensor 4 touches when the pressure sensor 4 is inserted between the fixing members 17, 17 and a projection 17d which continues from the inclined surface 17c and projects inwards with respect to an inner circumferential surface of a body 17a (the elastic arm portion 17a).

Then, when the pressure sensor 4 is inserted between the pair of elastic arm portions 17a, 17a, the shoulder portion 4b of the pressure sensor 4 touches the inclined surface 17c, and the elastic arm portion 17a elastically moves (or opens) outwards. The pressure sensor 4 is further inserted toward the circuit board 9 while being guided by these elastic arm portions 17a, 17a, and a head of the pressure sensor 4 is inserted into the pressure sensor insertion hole 13 formed on the mid-bottom wall section 8b, then the sensor terminal 4a of the pressure sensor 4 contacts the terminal contact pad 11 provided on the lower surface of the circuit board 9.

As shown in FIG. 7, the pair of elastic arm portions 17a, 17a are connected to each other by a connecting portion 17e at an end of the elastic arm portion 17a which is opposite side to the nail portion 17b, namely that the fixing member 17 (the pair of fixing members 17, 17) is formed as a single-piece element.

The fixing member 17 is fixed to the lower surface of the mid-bottom wall section 8b of the resin case 8 through the connecting portion 17e. A hole 17f into which the head of the pressure sensor 4 is inserted is formed at the connecting portion 17e.

In the embodiment above, the pair of elastic arm portions 17a, 17a are connected to each other by the connecting portion 17e, and the fixing member 17 (the pair of fixing members 17, 17) is formed as the single-piece element. However, the elastic arm portions 17a, 17a could be separately formed, and each elastic arm portion 17a could be fixed to the lower surface of the mid-bottom wall section 8b of the resin case 8. Further, the pair of elastic arm portions 17a, 17a might be formed integrally with the resin case 8 by molding.

Regarding material of the elastic arm portion 17a (the fixing member 17), as long as the material has moderate or a measure of elasticity and mechanical strength, the material can be used for the elastic arm portion 17a. The elastic arm portion 17a (the fixing member 17) could be formed from synthetic resin, or the elastic arm portion 17a (the fixing member 17) could be a metal plate.

Figure 8:
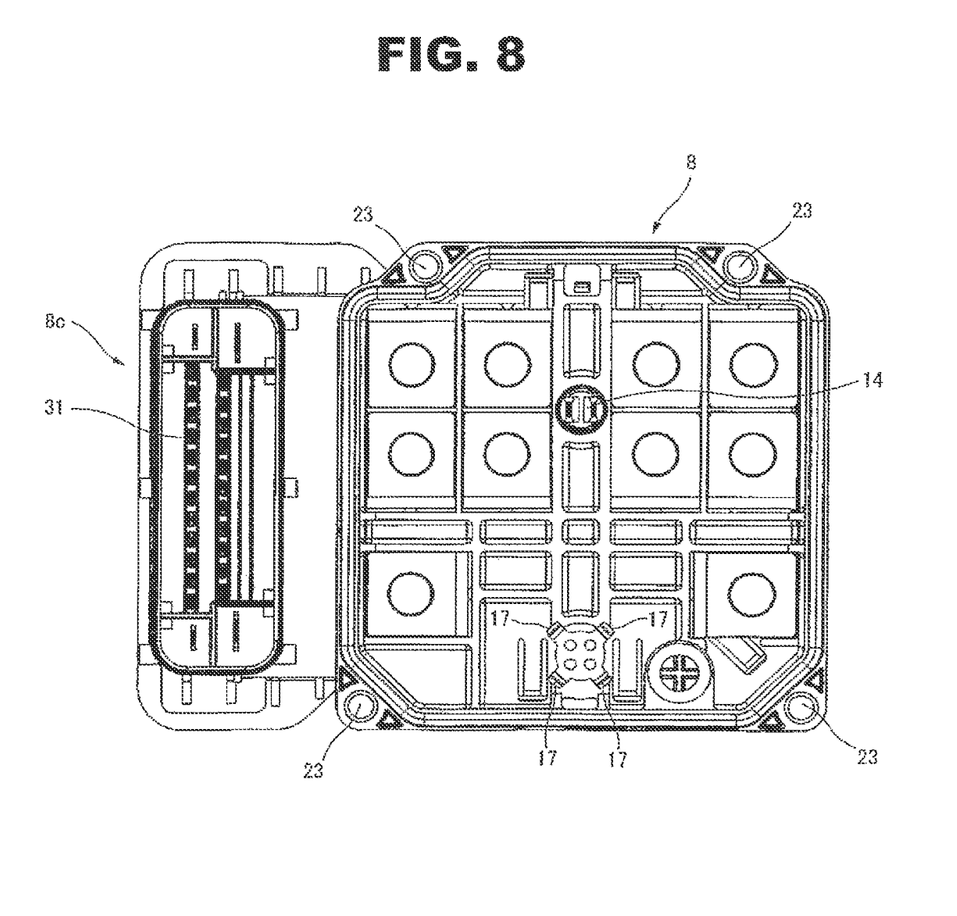
FIG. 8 is a drawing for explaining a modified example of a fixing member.

FIG. 8 is a drawing for explaining a modified example of the fixing member 17. In this example, four elastic arm portions 17a are arranged at a circumference of the pressure sensor 4 with these four elastic arm portions 17a shifted by a substantially 90° phase.

In the embodiment described above, the elastic arm portions 17a, 17a (the fixing members 17, 17) are arranged at both sides of the pressure sensor 4 that is located at the opposite side to the motor post 14, then the rotational movement of the pressure sensor 4 with the motor post 14 being the rotational axis is limited. In this modified example, with a structure of the four elastic arm portions 17a, not only the rotational movement of the pressure sensor 4 with the motor post 14 being the rotational axis, but movement of the pressure sensor 4 in a forward direction can also be limited, The other structure or configuration of the modified example is the same as that of the above embodiment, thus its explanation is omitted here.

The entire contents of Japanese Patent Application No. 2013-058892 filed on Mar. 21, 2013 are incorporated herein by reference.

Although the invention has been described is above by reference to certain embodiments of the invention, the invention is not limited to the embodiments described above. Modifications and variations of the embodiments described above will occur to those skilled in the art in light of the above teachings. The scope of the invention is defined with reference to the following claims,

What is claimed is:

1. An electronic control device comprising:
a hydraulic unit having an electromagnetic solenoid which controls a hydraulic circuit;
a circuit board having a terminal contact pad;
a resin case to which the circuit board is fixed;
a pressure sensor detecting a pressure of the hydraulic circuit and having a sensor terminal which contacts the terminal contact pad;
a motor installed in the hydraulic unit;
a motor post having a current-carrying member which electrically connects the motor and the circuit board, the motor post provided at and protruding from the resin case toward the hydraulic unit; and
a fixing member provided at the resin case and holding an outer periphery of the pressure sensor, the resin case being fixed to the hydraulic unit so as to cover the electromagnetic solenoid, the pressure sensor, and the motor post,
wherein, when the resin case is fixed to the hydraulic unit, the motor post is inserted in the hydraulic unit and the pressure sensor is fixed by the hydraulic unit and the fixing member, which makes positioning between the terminal contact pad and the sensor terminal of the pressure sensor, with the motor post defining a positioning axis, and establishes electric connection between the terminal contact pad and the sensor terminal of the pressure sensor.

2. The electronic control device as claimed in claim 1, wherein:
a pair of fixing members are arranged at least at both sides of the pressure sensor that is located at an opposite side to the motor post, and hold the outer periphery of the pressure sensor.

3. The electronic control device as claimed in claim 1, wherein:
the fixing member is formed by an elastic arm portion that has elasticity.

* * * * *